Aug. 7, 1945.  H. F. SCHULTZ  2,381,841
TRAILER HITCH
Filed July 21, 1944  2 Sheets-Sheet 1
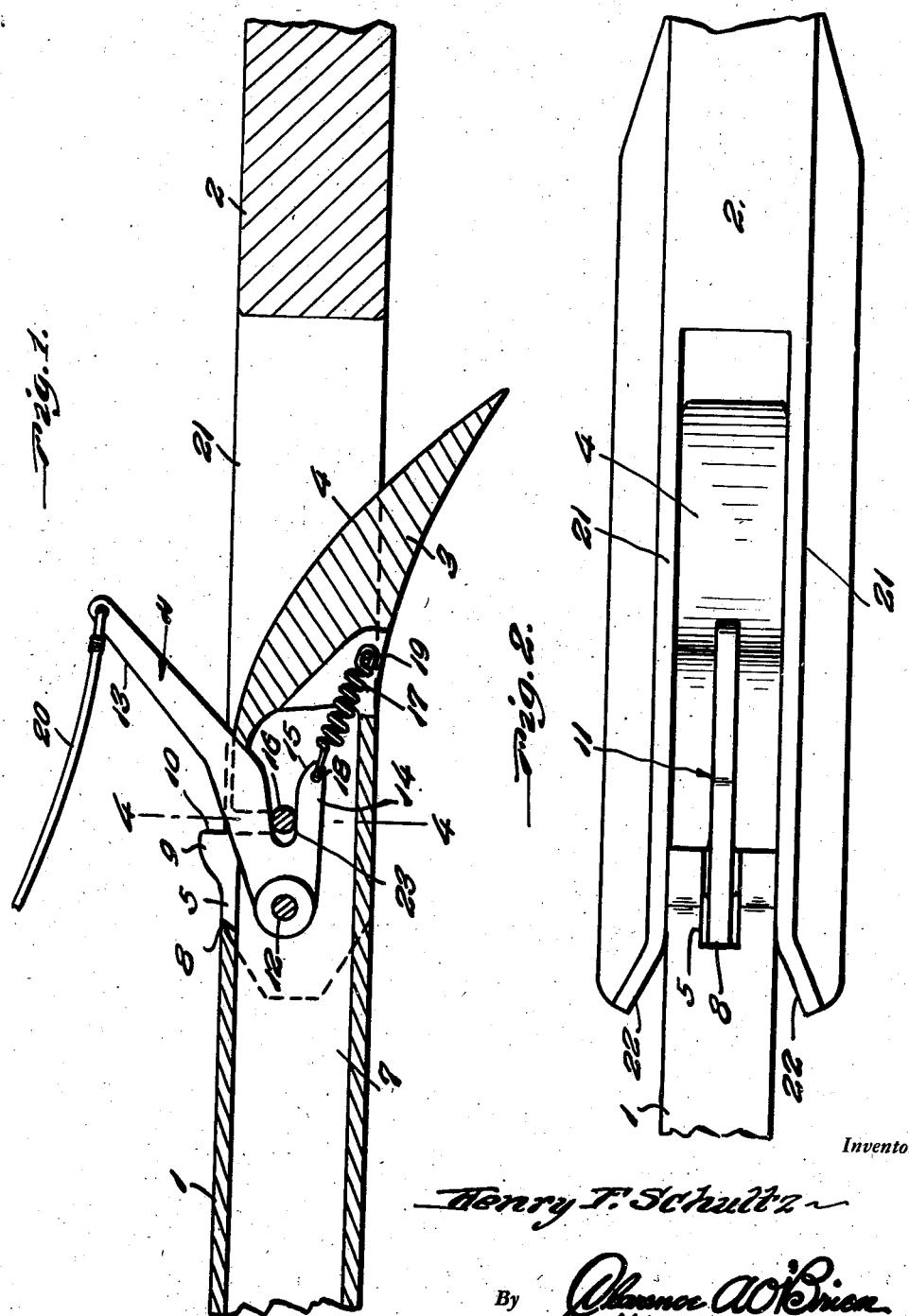
Inventor
Henry F. Schultz
By Clarence A. O'Brien
and Harvey B. Jacobson
Attorneys Aug. 7, 1945.  H. F. SCHULTZ  2,381,841
TRAILER HITCH
Filed July 21, 1944  2 Sheets-Sheet 2
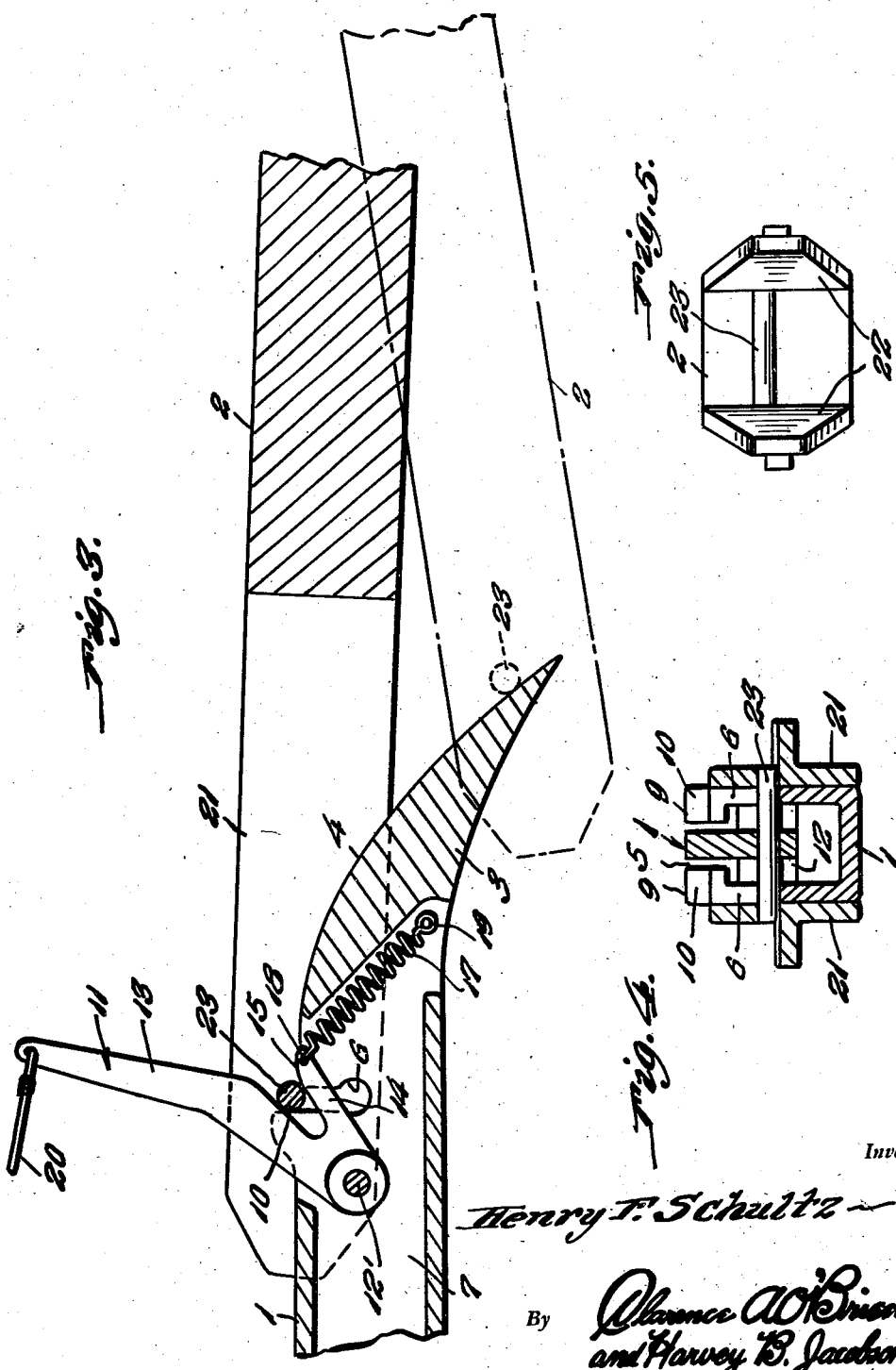
Inventor
Henry F. Schultz
By Clarence A. O'Brien
and Harvey B. Jackson
Attorneys Patented Aug. 7, 1945

2,381,841

UNITED STATES PATENT OFFICE 2,381,841

TRAILER HITCH

Henry F. Schultz, New Lothrop, Mich.

Application July 21, 1944, Serial No. 545,955

1 Claim. (Cl. 280—33.15)

My invention relates to improvements in trailer hitches, the primary object in view being to provide a simply constructed, inexpensive device, of few parts, for easily and quickly coupling the draft tongue of a wagon, or other farm implement, to a tractor, and which provides for uncoupling of the trailing vehicle from the tractor by the operator of the tractor while he is operating the same.

Other and subordinate objects are also comprehended by my invention, all of which, together with the precise nature of my improvements, will be readily understood when the succeeding description and claim are read with reference to the drawings accompanying and forming part of this specification.

In said drawings:

Figure 1 is a view in longitudinal section of my improved trailer hitch, in its preferred embodiment, with the parts shown in coupling relation, Figure 2 is a view in top plan, Figure 3 is a view similar to Figure 1 illustrating the parts in uncoupling relation, Figure 4 is a view in transverse section taken on the line 4—4 of Figure 1, Figure 5 is a view in front end elevation of the draft tongue.

Referring to the drawings by numerals, according to my invention, as illustrated, a draw bar member 1 for attachment to the usual draw bar of a tractor, or which may constitute the actual draw bar, and a draft tongue 2 for attachment to a trailing vehicle, or implement, such as a farm wagon or agricultural implement. The form of tractor and trailing vehicle, or implement, being immaterial to the invention, neither has been illustrated in the drawings.

The draw bar member 1 is of elongated form, rectangular shape in cross section, and hollow, with the exception of a rearwardly and downwardly curving solid rear end 3 having a transversely flat upper cam face 4 curving gradually forwardly and upwardly from a point well below the bottom of the main portion of said member to the top of said portion. An opening 5 is provided in the top of the member 1 in front of the cam face 4, and a pair of opposed downwardly extending slots 6 in the side 7 of the member and which are of inverted keyhole form and located between the front end of the cam face 4 and the front edge 8 of the opening 5. The sides 7 of the member 1 are extended above the top of the member to provide a pair of opposed upstanding stop lugs 9 having rear vertical abutment faces 10 vertically aligned with the front edges of the slots 6. The draw bar member 1 is provided with a lever 11 for uncoupling the hitch, and which comprises a hooked front end 12 pivoted within the draw bar member 1 by means of a transverse pin 13 extending between the sides 7 of said member, a long lever arm 13 normally extending rearwardly and upwardly out of the opening 5, a short lever arm 14 having a curved upper camming edge 15, and a rearwardly opening notch 16 between said arms. A coil spring 17 having one end attached to the short lever arm 14, as at 18, and its opposite end attached to a cross pin 19 in the draw bar member 1 yieldingly urges the lever 11 downwardly and rearwardly about the pivot 13 into a normal position in which the long lever arm 13 abuts the front end of the cam face 4, thus establishing the normal position of said lever 11. In the normal position of the lever 11, the notch 16 is horizontally aligned with the lower ends of the slots 6. A pull cable 20 is suitably attached to the long lever arm 13 of the lever 11 to be extended forwardly and for exerting pull on said lever 11 to swing the same upwardly and forwardly about the pin 13.

The draft tongue 2 is bifurcated to provide a pair of laterally spaced, forwardly extending, side cheek plates 21 adapted to straddle the draw bar member 1 and having flaring front ends 22 for facilitating entering said draw bar member between said plates. A cross pin 23 extends between the cheek plates 21 adjacent said ends 22 thereof and, in the coupled relation of the parts extends through the slots 6 of the draw bar member 1, and the notch 16 of the lever 11, said pin 23 seating in the lower ends of said slots 6.

Referring now to the operation of the described hitch, in coupling the hitch, the draw bar member 1 is backed, by means of the tractor, in between the cheek plates 21 of the draft tongue 2 to engage the cross pin 23 with the cam face 4 which, under continued backing of said draw bar cams said pin, together with the tongue 2, upwardly until said pin engages the rear edge of the lever arm 13 of the lever 11. From this point, said pin 23 slides along the top of the draw bar member 1 until it strikes the abutment faces 10 of the stop lugs 9 and by sliding engagement with the rear edge of the lever arm 13 swings the lever 11 forwardly and upwardly, in opposition to the spring 17. Such movement of said lever 11 positions the mouth of the notch 16 above the top of said member 1 so that the cross pin 23 enters said notch as said pin reaches a position of vertical alignment with the slots 6. At this point, backing of the draw bar member 1 having been stopped, the spring 17 acts to swing the lever 11 back into normal position, the notch 16 camming the cross pin 23 down into the slots 6 to seat upon the lower ends of said slots. Obviously, if the cross pin 23 has not been jammed against the abutment faces 10, said pin will tend to drop into the slots 6 under the influence of gravity. However, in case said pin 23 binds against said faces 10, the described operation of the lever 11 is of particular advantage in positively forcing said pin down into the slots 6. As will be seen, in the normal position of the lever 11, said lever also functions to yieldingly lock the cross pin 23 in the slots 6 against upward movement out of the same. To uncouple the described hitch, it is merely necessary to exert sufficient pull on the pull cable 20 to swing the lever 11 upwardly, into the position shown in Figure 3, to cause the short lever arm 14 to cam the cross pin 23 upwardly out of the slots 6, as shown in said figure, so that the draw bar member 1 may be pulled forwardly out from between the cheek plates 21.

The foregoing will, it is believed, suffice to impart a clear understanding of my invention without further explanation.

Manifestly, the invention, as described, is susceptible of modification without departing from the inventive concept, and right is herein reserved to such modifications as fall within the scope of the appended claim.

What I claim is:

In a hitch of the class described, a draft tongue having a bifurcated front end provided with a cross pin therein, a draw bar member adapted to be backed into said front end of the draft tongue, said bar being hollow and provided with a pair of side slots therein of inverted keyhole form having upper ends open at the top of said bar and into which said pin is adapted to enter to interlock said tongue with said bar, said bar having an upwardly and forwardly curving rear end for engagement with said pin to cam the pin upwardly onto the top of said bar and position the same over said upper ends of the slots when said tongue is backed, and means to yieldingly restrain said pin against upward movement out of said slots, comprising a spring-tensioned lever extending out of said bar for operation thereof in opposite directions and having a rearwardly opening forked end pivoted within said bar and adapted to straddle said pin, said end being constructed and arranged to cam said pin into and out of said slots under movement of the lever in opposite directions, respectively, said slots having front stop-forming edges above the top of said bar for engagement by said pin to locate the same over the upper ends of said slots.

HENRY F. SCHULTZ.